(12) United States Patent
Schliwa et al.

(10) Patent No.: US 10,940,946 B2
(45) Date of Patent: Mar. 9, 2021

(54) SYSTEM FOR DISPOSING WASTE PRODUCTS IN A MEANS OF TRANSPORTATION

(71) Applicant: AIRBUS OPERATIONS GMBH, Hamburg (DE)

(72) Inventors: Ralf Schliwa, Hamburg (DE); Marc Spille, Hamburg (DE)

(73) Assignee: Airbus Operations GmbH

( * ) Notice: Subject to any disclaimer, the term of this patent is extended or adjusted under 35 U.S.C. 154(b) by 724 days.

(21) Appl. No.: 15/730,599

(22) Filed: Oct. 11, 2017

(65) Prior Publication Data

US 2018/0029710 A1 Feb. 1, 2018

Related U.S. Application Data

(63) Continuation of application No. PCT/EP2016/059946, filed on May 3, 2016.

(30) Foreign Application Priority Data

May 5, 2015 (DE) ...................... 10 2015 106 984.9

(51) Int. Cl.
*B64D 11/04* (2006.01)
*B64D 11/00* (2006.01)
(Continued)

(52) U.S. Cl.
CPC .......... *B64D 11/04* (2013.01); *B64D 11/0007* (2013.01); *B65F 1/12* (2013.01);
(Continued)

(58) Field of Classification Search
CPC ...................................... B65F 1/127
See application file for complete search history.

(56) References Cited

U.S. PATENT DOCUMENTS 3,735,898 A 5/1973 Smith
3,866,861 A * 2/1975 Ratcliff .................. B64D 11/00
244/118.5
(Continued)

FOREIGN PATENT DOCUMENTS

CH 700180 B1 7/2010
CN 103025509 A 4/2013
(Continued)

OTHER PUBLICATIONS

International Searching Authority, International Search Report for International Application No. PCT/EP2016/059946 dated Aug. 2, 2016.
(Continued)

*Primary Examiner* — Mark C Hageman
(74) *Attorney, Agent, or Firm* — Lerner, David, Littenberg, Krumholz & Mentlik, LLP (57) ABSTRACT

A system for disposing waste in a transportation system includes a collection device for collecting waste in the cabin of the transportation system, a separate receptacle device for receiving collected waste from the collection device, and a connection device for selectively connecting the collection device to the receptacle device in order to deliver collected waste from the collection device into the receptacle device. The receptacle device is arranged in a lower deck region underneath the cabin floor. The connection device extends into the receptacle device from the cabin floor and includes a closure that is arranged on or in the cabin floor. The collection device is mechanically couplable to the connection device, and includes a closable output opening aligned with the closure of the connection device in the coupled state. The closure and/or the output opening can only be opened when the collection device is coupled to the receptacle device.

14 Claims, 6 Drawing Sheets

(51) Int. Cl.
    *B65F 1/12*     (2006.01)
    *B64D 11/06*    (2006.01)
    *B60N 3/08*     (2006.01)

(52) U.S. Cl.
    CPC .......... *B60N 3/08* (2013.01); *B62B 2202/67* (2013.01); *B64D 11/0636* (2014.12)

(56) References Cited

U.S. PATENT DOCUMENTS

| | | | |
|---|---|---|---|
| 3,908,749 | A | 9/1975 | Williams |
| 4,444,099 | A | 4/1984 | Paleschuck |
| 4,573,650 | A * | 3/1986 | Clayton ............... B64D 11/02 244/1 R |
| 4,719,852 | A | 1/1988 | Durbin et al. |
| 5,322,244 | A | 6/1994 | Dallmann et al. |
| 6,012,678 | A | 1/2000 | Hale et al. |
| 6,223,361 | B1 | 5/2001 | Rozenblatt |
| 6,994,022 | B2 | 2/2006 | Paleschuck |
| 9,415,873 | B2 * | 8/2016 | McIntosh ............... B64D 11/04 |
| 2002/0092580 | A1 | 7/2002 | Miller |
| 2007/0034098 | A1 | 2/2007 | Labeille et al. |
| 2008/0034987 | A1 | 2/2008 | Claflin et al. |
| 2009/0012485 | A1 | 1/2009 | Michaels |
| 2012/0103206 | A1 | 5/2012 | Doaran et al. |
| 2014/0041110 | A1 | 2/2014 | Dannenberg |
| 2015/0108888 | A1 | 4/2015 | Galimberti |
| 2015/0343732 | A1 | 12/2015 | Schliwa |

FOREIGN PATENT DOCUMENTS

| | | |
|---|---|---|
| DE | 4120743 A1 | 1/1993 |
| DE | 10129905 B4 | 4/2004 |
| DE | 102007018911 A1 | 10/2008 |
| DE | 102009021969 A1 | 11/2010 |
| DE | 102015108442 A1 | 12/2016 |
| DE | 102016103376 A1 | 8/2017 |
| DE | 102016103377 A1 | 8/2017 |
| EP | 0931720 A2 | 7/1999 |
| EP | 1132293 B1 | 9/2004 |
| EP | 2695812 A1 | 2/2014 |
| EP | 2949459 A1 | 12/2015 |
| EP | 2949495 A1 | 12/2015 |
| WO | 2010020964 A2 | 2/2010 |
| WO | 2011091047 A1 | 7/2011 |
| WO | 2016189131 A1 | 12/2016 |
| WO | 2016189143 A1 | 12/2016 |

OTHER PUBLICATIONS

German Patent and Trademark Office, German Search Report in Application No. DE 10 2015 106 984.9, dated Jun. 18, 2015.
German Patent and Trademark Office, German Search Report in Application No. DE 10 2016 103 375.8, dated Oct. 18, 2016.
German Patent and Trademark Office, German Search Report in Application No. DE 10 2016 103 376.6, dated Oct. 18, 2016.
German Patent and Trademark Office, German Search Report in Application No. DE 10 2016 103 377.4, dated Oct. 18, 2016.
German Patent and Trademark Office, German Search Report in Application No. DE 10 2016 103 378.2, dated Oct. 18, 2016.
State Intellectual Property Office of the People's Republic of China, Office Action received for Application No. 201510284659.9 dated Feb. 3, 2017.
European Patent Office International Searching Authority, International Search Report and Written Opinion for International Application No. 17156077.4 dated Jul. 20, 2017.
European Patent Office International Searching Authority, International Search Report and Written Opinion for International Application No. 17156077.4 dated Nov. 16, 2017.

* cited by examiner

SYSTEM FOR DISPOSING WASTE PRODUCTS IN A MEANS OF TRANSPORTATION

CROSS-REFERENCE TO PRIORITY APPLICATIONS

This application is a continuation of international patent application number PCT/EP2016/059946, having an international filing date of May 3, 2016, which claims priority to German patent application number DE 102015106984.9, having a filing date of May 5, 2015. The content of the referenced applications is incorporated by reference herein.

TECHNICAL FIELD

Embodiments of the invention pertain to a system for disposing waste products in a means of transportation, a method for disposing waste products in a means of transportation, as well as a means of transportation, particularly an aircraft, that comprises a cabin and at least one system for disposing waste products.

BACKGROUND

Foods and beverages are frequently consumed aboard means of transportation that serve for transporting passengers and result in waste products. Aboard passenger aircraft, in particular, these waste products are predominantly collected by the cabin personnel and have to be disposed after the end of the flight. Since the disposal at random destinations is respectively associated with disposal fees, waste products are frequently stored aboard the aircraft and subsequently disposed at a home airport.

In means of transportation intended for traveling short distances, in particular, the cabins are designed for a large number of passenger seats and only have a negligible capacity for the storage of foods and beverages and for the storage of waste products.

European patent document EP 1 132 293 B1 discloses passenger seats for aircraft that are equipped with adapters allowing the integration of waste receptacles. Although the personal storage of waste products does not require any storage options for storing the waste products produced in the entire cabin, these personal waste receptacles have to be successively emptied by cabin or cleaning personnel after the flight and the waste products subsequently have to be disposed or stored.

Receptacles for aircraft galleys, which can accommodate trash and, for example, compact the trash in order to increase the storage volume, are also known, for example, from German patent document DE 10 129 905 B4.

BRIEF SUMMARY

An object of the disclosure therefore lies in proposing a system for disposing waste products in a means of transportation that, in particular, may also be used in cabins with limited space and requires the least modifications possible on installations in the cabin, wherein said system also has a low weight, may be easily and quickly operated and functions reliably.

This object is met by means of a system for disposing waste products in a means of transportation with the characteristics of independent claim 1. Advantageous embodiments and enhancements can be gathered from the dependent claims and the following description.

A system for disposing waste products in a means of transportation is proposed, wherein said system comprises a collection device for collecting waste products in a cabin of the means of transportation, a separate receptacle device for receiving collected waste products from the collection device, and a connection device for selectively connecting the collection device to the receptacle device in order to deliver collected waste products from the collection device into the receptacle device. The receptacle device is arranged in a lower deck region underneath a cabin floor. The connection device extends at least partially from the cabin floor to the receptacle device and comprises a closure arranged on or in the cabin floor. The collection device is mechanically couplable to the connection device and comprises a closable output opening that is aligned with the closure of the connection device in the coupled state.

A system according to an embodiment of the invention therefore comprises three main components that are realized separately of one another and described below.

The collection device for collecting waste products may have any design that enables, in particular, the cabin personnel to collect waste products in the cabin, for example, after foods or beverages have been consumed by passengers. The volume and therefore the size of the collection device are defined in dependence on the size of the cabin or the area, for which an individual collection device is practicable. The collection device preferably can be displaced on the cabin floor in order to enable the cabin personnel to conveniently collect the waste products, wherein the collection device can also be temporarily locked because the means of transportation is usually in motion while the collection device is used. If the system according to the invention is used in a passenger aircraft, in particular, it is advantageous to realize the collection device in the form of a cabin trolley or serving cart or the like. The collection device preferably can accommodate a closable bag that can be filled and once again removed from the collection device in the filled state.

The receptacle device, which is realized separately of the collection device, serves for receiving the collected waste products from the collection device and therefore preferably has a volume that significantly exceeds the volume of the collection device. The collected waste products can be stored in the receptacle device until a home location or home airport is reached, at which the waste products can be disposed. The utilization of a receptacle device therefore allows the elimination of storage volume directly in the cabin and the reduction of costs that would be incurred due to the frequent disposal of waste products at different destinations.

In order to preserve the limited and valuable space available in a cabin for the transport of passengers, the receptacle device is arranged in a lower deck region, in which loose cargo, cargo containers or the like may usually be located depending on the type of transportation means. The receptacle device could be positioned at a suitable location that provides adequate volume and therefore sufficient capacity for collected waste products. The receptacle device may be positioned directly underneath the floor, as well as in lower areas as long as a connection between the receptacle device and a collection device can be produced.

The connection device acts as an interface and produces a connection between the collection device and the receptacle device such that collected waste products can be delivered from the collection device into the receptacle device. The connection device may likewise have many different designs, wherein the respectively chosen design depends on the positioning of the receptacle device within the means of transportation. For example, if a receptacle device would be located directly underneath a cabin floor and therefore be accessible through an opening in the cabin floor, the connection device could be limited to a closable opening that can connect an output opening of the collection device to the receptacle device. However, if the receptacle device is positioned at a location that is difficult to access from the passenger cabin, the connection device could also comprise a shaft-like device, through which the collected waste products can be gravitationally conveyed not only in the vertical direction, but also in the lateral direction.

Opening of the closure of the connection device and/or the output opening is preferably restricted to situations, in which the collection device is coupled to the connection device. In this way, it may be reliably prevented that the collection device is emptied when it is not located in the vicinity of the connection device. This type of opening the closure in dependence on the coupling is also sensible for preventing a person from inadvertently getting into the closure such that a potential risk of injuries is eliminated.

Furthermore, the connection device is preferably designed in such a way that an obstruction of passengers or cabin personnel is completely ruled out in a closed state and neither a tripping hazard nor an unexpected depression in the cabin is produced. Consequently, the connection device preferably is arranged completely flush with the surface of the cabin floor and can only be respectively activated or deactivated as needed.

It is particularly advantageous if the closure and/or the output opening is only openable when the connection device is coupled to the collection device. Operating errors are thereby eliminated such that the safety in the cabin is in no way impaired in comparison with a conventional cabin without the system according to the invention.

In an advantageous embodiment, the receptacle device is arranged directly underneath the cabin floor. A cargo hold or a luggage compartment, which is Tillable with loose cargo, cargo containers or luggage at will, is particularly suitable for this purpose. If the receptacle device is arranged in a cargo hold, in particular, it would be possible to use a standard container or a different type of container that can be positioned and locked in the cargo hold. It is particularly preferred that the receptacle device can be easily exchanged such that it is merely required to exchange receptacle devices directly on the means of transportation instead of having to manually clean collected waste products out of the receptacle device and the overall frequency of use of the means of transportation does not suffer. In an aircraft, for example, it would be advantageous to use the cargo hold in connection with a container that can be easily removed therefrom and has a standard depth or a preferably low depth that can be chosen from a grid. It naturally has to be ensured that the receptacle device securely remains at the intended location during the operation of the means of transportation such that sufficient locking devices for locking the receptacle device should be used. This makes it possible to ensure, in particular, that other cargo is not endangered and that an input opening in the receptacle device furthermore is always aligned with the connection device. If a means of transportation can be equipped with such an exchangeable receptacle device that preferably has standardized dimensions, it is sensible to correspondingly mark an area in the cargo hold such that the input opening in the receptacle device is always correctly positioned relative to the cabin.

In another advantageous embodiment, the closure comprises a displaceably mounted shutter that is displaceable between a closed position and an open position parallel to the cabin floor. For this purpose, the shutter has a size that at least corresponds to or exceeds the size of the output opening of the collection device. The displacement of the shutter parallel to the cabin floor has several disadvantages. On the one hand, the shutter can always be freely moved regardless of the filling level of the receptacle device because the shutter is not pivoted relative to or into the receptacle device. On the other hand, it would be conceivable that the collection device and the connection device are adapted to one another in such a way that a motion of the shutter can be coupled to a motion of the collection device, wherein this is particularly advantageous for collection devices that can roll on the cabin floor. However, the moveability of the shutter parallel to the cabin floor does not necessarily mean that the shutter can only be moved parallel to the cabin floor. It may also be advantageous if the shutter is at least in certain areas vertically raised or lowered before its displacement is initiated. This makes it possible to prevent the shutter from being inadvertently opened by a person or an object on the cabin floor because the shutter abuts on the edges of an opening in the cabin floor in these instances and therefore remains in its position.

In an alternative embodiment, a device having several segments, which are connected to one another in an articulated fashion and is movable like louvers or roller blinds, is used instead of a displaceable shutter. It is advantageous to guide the closure device on or underneath the cabin floor and to provide a roll-up device underneath the cabin floor, if so required, depending on the size of the segments and of the opening in the cabin floor.

It is furthermore advantageous if the connection device comprises a movably mounted driver that is movable from a stowed position, in which it ends flush with the cabin floor, into a driving position, in which it protrudes from the cabin floor, and locked therein, wherein the driver is mechanically couplable to the collection device. The driver is a mechanical component that can be coupled to the collection device in such a way that the shutter or another closure element is driven by a motion of the collection device. A separate actuation of a shutter or another closure element can therefore be eliminated such that not only the complexity and the weight of the connection device are lowered, but also the risk of inadvertently opening the connection device when the collection device is not located in its vicinity.

In order to realize this driving function, the driver has to protrude into the cabin such that it is coupled to a device of the collection device corresponding thereto. In a particularly simple design, the driver includes a plate-shaped elongated component that extends transverse to an expected motion of the collection device and can be at least temporarily locked on the shutter or another closure element in this position. In this case, the driving function may be simply realized due to mechanical surface contact between the driver and an edge of the collection device pointing toward the cabin floor.

In an embodiment, the driver is manually movable from the stowed position into the driving position by means of a handle. If the driver is arranged flush with the cabin floor in its stowed position and designed in a pivotable fashion, for example, by means of a joint or hinge, a handle that is spaced apart from the joint may be used for raising the driver. A locking device that comprises, for example, a locking lever and a depression corresponding thereto could likewise be manually actuated. On the other hand, it would be conceivable to couple the motion of the driver and the engagement of a locking device.

Alternatively, the connection device may also comprise an actuator that is coupled to the driver and moves the driver between the stowed position and the driving position in response to a control command. In this case, the stowed position may be realized in such a way that the driver ends in its stowed position completely flush with the cabin floor and a handle for manually moving the driver does not have to be accessible from a position above the cabin floor. The actuator can preferably be located underneath the cabin floor and connected to the driver by means of a lever or a shaft. All conceivable and commercially available actuators, which can carry out a linear motion or a rotary motion, may be considered as actuators. As mentioned above, it may be advantageous to couple a pivoting motion of the driver with an actuation of the locking device. The control command for driving the actuator may likewise originate from different devices. The generation of the control command is preferably dependent on the collection device and/or on the position of the collection device.

It is advantageous if the collection device comprises at least one pivotably mounted shutter that is arranged on the output opening and is selectively movable into a horizontal closed position and into an open position, in which it is pivoted toward the connection device. The collection device therefore has a boundary that is directed toward the cabin floor and only allows a bag with waste products to slide out toward the cabin floor when the shutter is opened. It is not absolutely necessary to use only one shutter, but it would also be conceivable to use two or more shutters. When using two shutters that are pivotably mounted on opposite sides, a closed position may be promoted in that the two shutters mutually interlock. Furthermore, the at least one shutter can be pivoted vertically downward, i.e. toward the cabin floor or the connection device, and thereby makes it possible to fully utilize the volume of the collection device because a shutter does not have to be pivoted upward in the direction of the collected waste products.

The use of other closure devices on the collection device also cannot be ruled out. For example, the bottom of a collection device could likewise be opened and closed with a closure that includes slats, wherein these slats are connected to one another in an articulated fashion and can be guided on a sidewall of the collection device.

The collection device may be provided with suitable means for opening and closing the output opening that may not only comprise, for example, electric actuators, but also a pedal, a crank, a lever or the like.

In a particularly advantageous embodiment, the collection device comprises at least one movable locking body that is designed for selectively producing a positive connection with the connection device or the cabin floor. Since the connection device is located above the connection device in the situation, in which collected waste products are delivered into the receptacle device, it would be conceivable to use locking bodies that can be displaced in the vertical direction. A positive connection may be produced, e.g., by lowering the locking bodies into corresponding openings. In order to minimize the required positional accuracy, the openings may be equipped with corresponding guides that make it possible to guide the locking bodies into an intended end position when the collection device with its downwardly displaced locking bodies is lowered or moved. For example, such an opening could widen conically upward in the direction of the cabin, but it would alternatively also be possible to taper an insertion opening with particularly large dimensions in a plane parallel to the cabin floor. All in all, the collection device is guided into an intended end position during a motion thereof.

The collection device may comprise at least one control element that is coupled to the at least one shutter and the at least one locking body and designed for moving the at least one shutter and the at least one locking body simultaneously, successively or independently of one another. In order to simplify the control, it would be advantageous to control all required components with a minimal number of control elements. It would therefore be possible to control the at least one shutter, as well as the locking bodies, with only one control element, wherein the functions would have to be sensibly coupled to one another. For example, it should be ensured that the output opening can only be completely opened when the collection device is located in the correct position, wherein this is the case, in particular, when the locking bodies are aligned. However, several control elements could also be provided and moved completely independent of one another. In this context, it would likewise be advantageous to mark the control elements in such a way that a certain sequence is defined.

A system according to an embodiment of the invention may furthermore comprise a trigger unit that is positionable on the connection device or the cabin floor and coupled to the actuator, wherein said trigger unit is designed for driving the actuator in order to move the driver when a trigger signal is received. The trigger signal may be generated by the collection device itself, e.g. with a transmitting device, when the collection device is respectively positioned or locked in the intended position. It is conceivable to couple the generation of the trigger signal with the motion of locking bodies and/or of at least one shutter on the collection device. It would likewise be conceivable to equip openings in the floor or the connection device, which correspond to locking bodies, with sensors that generate a corresponding trigger signal when an end position of the locking bodies is reached.

The trigger unit may furthermore comprise a sensor that is designed for detecting the presence of the collection device on the connection device, wherein the trigger unit is designed for only driving the actuator if the sensor detects the presence of the collection device. In this way, operating errors can be ruled out because the connection device is only opened when a collection device is actually located on top thereof.

In another advantageous embodiment, the receptacle device may comprise at least two chambers that are separated from one another by a partition wall and a variable separating device that is designed for selectively connecting the individual chambers to the connection device. The division of the receptacle device allows the separation of different types of waste products. For this purpose, the separating device comprises, for example, a pivotably mounted skid pad and is transferable into different positions or states that allow a selective delivery of waste products from the collection device into the receptacle device. It is preferred to control the separating device from the collection device such that a user can select and thereby make accessible a correspondingly provided chamber depending on the type of waste products to be delivered.

The disclosure furthermore pertains to a means of transportation that comprises a cabin with a cabin floor and a lower deck region, as well as a system according to the preceding description. In an advantageous embodiment, the means of transportation is an aircraft. Although the realization of such a system is advantageous in all means of transportation and especially in all aircraft, the aircraft may particularly include a so-called "single-aisle" aircraft that merely comprises a center aisle and has limited capacities for collecting waste products within the cabin, i.e. in galley monuments or the like. Due to the integration of the system according to the invention into such an aircraft, the required frequency of the disposal of waste products can be significantly reduced such that not only the disposal costs are reduced, but also the time required for the disposal of waste products.

The disclosure also pertains to a method for disposing waste products in a means of transportation, which comprises the steps of collecting waste products with the aid of a collection device, positioning the collection device above a connection device arranged in or on the cabin floor, opening the connection device and delivering collected waste products from the collection device into a receptacle device that is preferably arranged underneath the cabin floor through the connection device. The method preferably comprises the step of locking the collection device simultaneously with or prior to opening the connection device. With the exception of the collection and the delivery of the waste products, the described steps are carried out in the reverse sequence in order to conclude the method.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of exemplary embodiments and the figures. In this respect, all described and/or graphically illustrated characteristics form the object of the disclosure individually and in arbitrary combination, namely regardless of their composition in the individual claims or their references to other claims. In the figures, identical or similar objects are furthermore identified by the same reference symbols.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
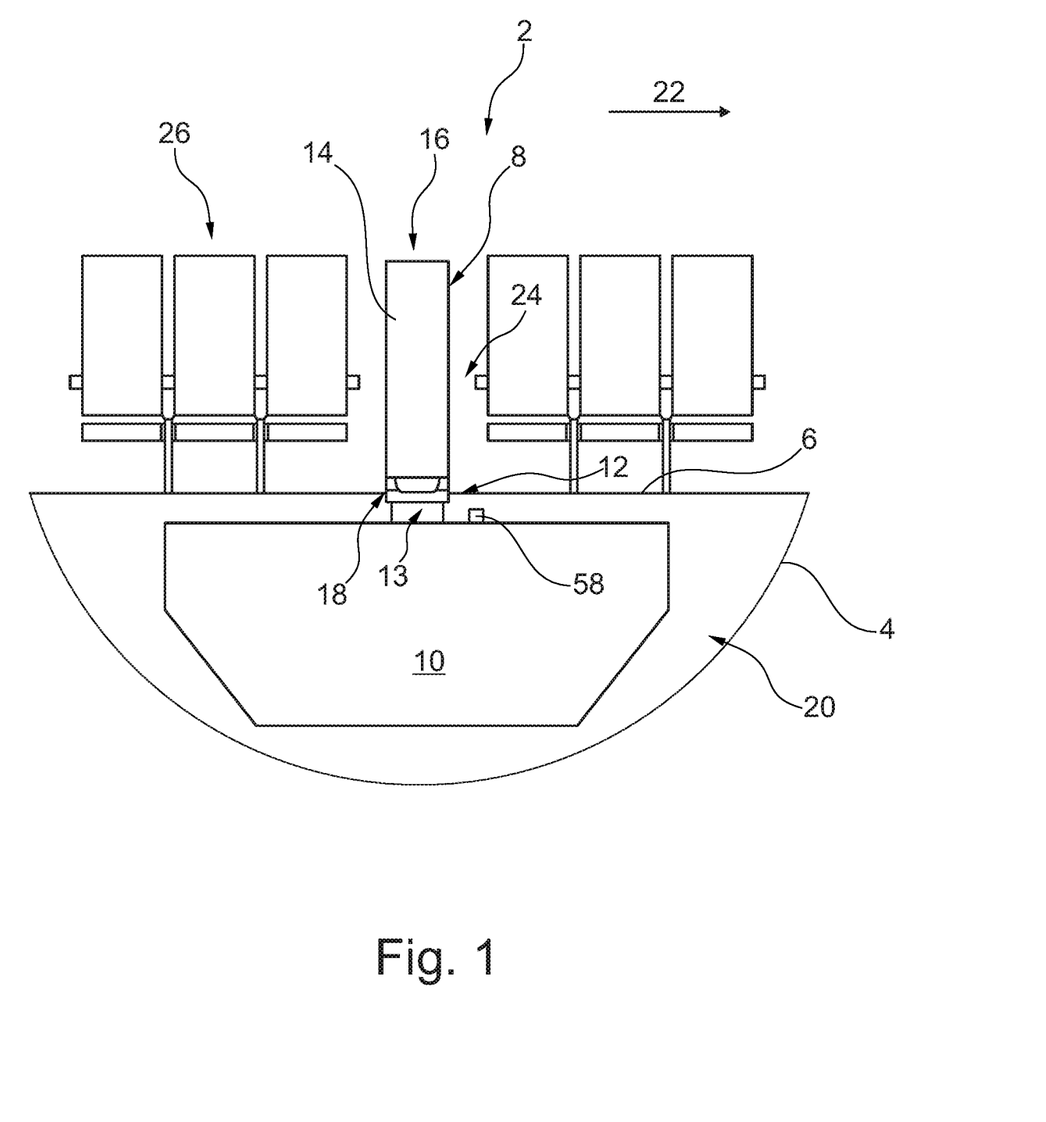
FIG. 1 shows a sectioned view of a cabin of an aircraft with a system according to an embodiment of the invention.

FIG. 1 shows a cabin 2 of an aircraft 4 in the form of a schematic sectioned view, in which a horizontally extending cabin floor 6, a collection device 8 for collecting waste products in the cabin 2, a receptacle device 10 for receiving collected waste products and a connection device 12 for selectively connecting the collection device 8 to the receptacle device 10 are illustrated. The collection device 8 is exemplified in the form of a cabin trolley or serving cart with a volume 14, in which waste products can be collected. This cabin trolley preferably corresponds to a standardized "full-size" trolley or a "half-size" trolley that may be used, in particular, in very compact galleys. For example, a not-shown bag may be suspended or clamped in the volume 14, wherein said bag extends from an upper end 16 of the collection device to a lower end 18 and may be easily delivered into the receptacle device 10 after it has been closed. The collection device 8 may be freely moved on the cabin floor 6 like a conventional serving cart and is preferably temporarily lockable by actuating brakes.

The receptacle device 10 exemplified in the form of a freight container is arranged underneath the cabin floor 6, i.e. in a lower deck region 20, and serves for receiving and temporarily storing collected waste products from the collection device 8 as needed, preferably in order to dispose said waste products after the removal of the receptacle device 10 from the aircraft 4. This may particularly save disposal costs that would otherwise be incurred for each disposal of smaller quantities of waste products. The time required for preparing the cabin 2 prior to a flight between the landing and the takeoff of the aircraft 4 may thereby be reduced.

The lower deck region 20, in which the receptacle device 10 is arranged, is preferably realized in the form of a cargo hold. The receptacle device 10 may be locked therein in a predefined position such that its correct alignment relative to the connection device 12 may always be ensured during the flight.

The connection device 12 is provided for delivering waste products from the collection device 8 into the receptacle device 10, wherein said connection device may be directly integrated into the floor 6 and comprises a closure 13 that may produce a connection between a region located above the connection device 12 and a region located underneath the cabin floor 6 by means of a closable opening. The collection device 8 may be mechanically coupled to the connection device 12, for example, in order to align an output opening of the collection device 8 that is not visible in this illustration and the closure 13 of the connection device 12 such that the collected waste products are gravitationally delivered into the receptacle device 10 located underneath the closure 13 after said closure has been opened.

The connection device 12 is exemplified in a central region of the cabin floor 6 referred to a lateral cabin axis 22, e.g. in an aisle 24 located between two groups of seats 26. This corresponds to the cabin of a so-called "single-aisle" aircraft, in which six seats are arranged in a row and only a single aisle 24 is provided between said seats. This allows a particularly advantageous utilization of a cargo hold located underneath the floor 6.

Figure 2:
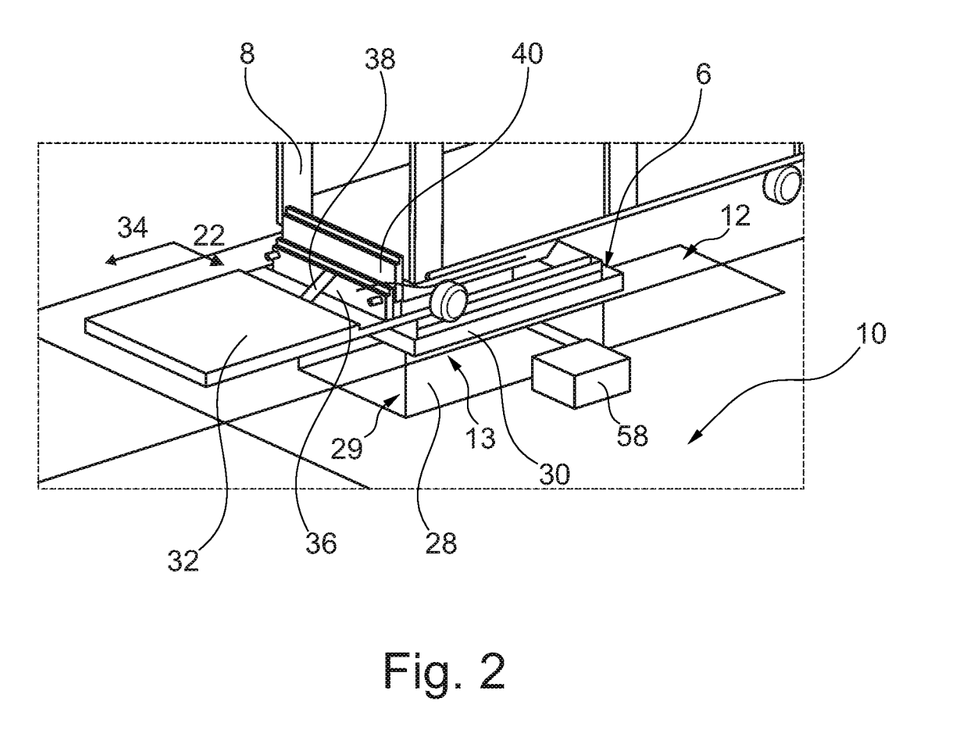
FIG. 2 shows a detail of the system according to an embodiment of the invention in the form of a three-dimensional view.

FIG. 2 shows a three-dimensional view of a detail of the system according to an embodiment of the invention. This figure only shows part of an upper region of the receptacle device 10 that comprises an opening 28, through which the waste products are received. The connection device 12 is also schematically illustrated in this figure and comprises a frame 30 of sorts, in which a shutter 32 is displaceably mounted along a first axis 34 that extends, for example, parallel to an axis of the aisle 24, i.e. transverse to the lateral axis 22. The closure 13 therefore is opened or closed by moving the shutter 32 that forms part of the closure 13.

The shutter 32 may be displaceable, for example, in a single plane arranged parallel to the cabin floor 6 only. However, it may also be advantageous to slightly lower the shutter 32 into the cabin floor 6 in a closed position and to vertically pull the shutter out of the cabin floor 6 as needed. This motion may be carried out, in particular, by means of a not-shown actuator that is driven by an electronic unit 58. Details in this respect may be gathered from the description of FIG. 5.

The shutter 32 is equipped with a driver 36 that is manually pivotable from a horizontal position, in which it flushly extends in the floor 6, into a vertical position and locked by means of a lever 38, which likewise may be movable on one side and is mounted, in particular, in a pivotable fashion, in order to be moved from an edge of the collection device 8 that acts as an abutment edge 40 along the first axis 34. The lever 38 could be transferred into a locking position, in which the driver 36 is blocked from pivoting backward and a displacement of the shutter 32 may take place, either manually or due to the pivoting motion of the driver 36 only.

The abutment edge 40 consequently may be mechanically coupled to the driver 36 and therefore to the connection device 12 due to surface contact and makes it possible to successively open the closure 13 by displacing the shutter 32 when the collection device 8 is displaced along the axis 34. Waste products therefore may be dropped into the receptacle device 10 once the opening 28 of the receptacle device 10 is aligned with the connection device 12.

FIG. 2 shows the collection device 8 in an open position of the shutter 32, in which waste products may be dropped through the opening 28 of the receptacle device 10. For example, the connection device 12 comprises a rigid or retractable shaft 29 that at least partially extends into the receptacle device 10 and serves as a guide in order to prevent waste products from being misplaced between the connection device 12 and the receptacle device 10.

Figure 3A:
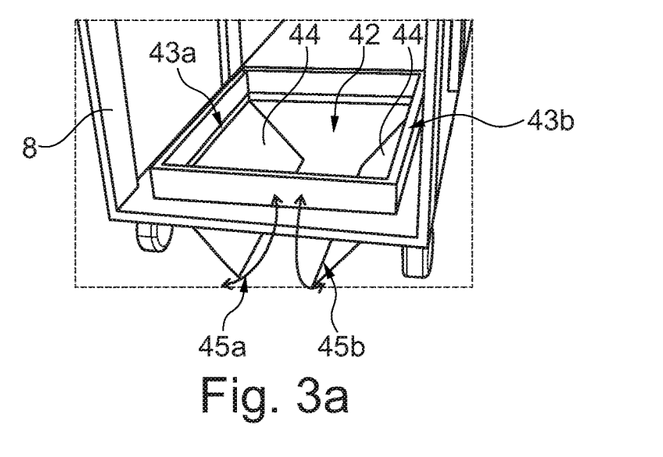
FIGS. 3a, 3b and 3c show other details in the form of three-dimensional views.

FIG. 3a shows that the collection device 8 may comprise an output opening 42 that is closable by means of pivotably mounted shutters 44. For example, these shutters are pivotably mounted on outer edges 43a and 43b and optionally may mutually interlock on inner edges 45a and 45b in order to reduce a holding force of the two shutters 44 in a closed position. The shutters 44 may be pivoted by means of an actuator, as well as a manually operated mechanism, wherein the latter possibly results in a lower overall weight of the collection device 8 than an actuator-based solution.

Figure 3B:
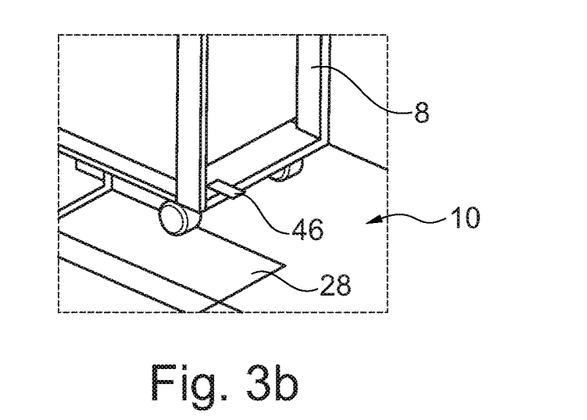

According to FIG. 3b, the collection device 8 comprises an exemplary control element in the form of a pedal 46 that makes it possible, among other things, to initiate the opening of the shutters 44. It is conceivable that the shutters 44 may only be opened when the collection device 8 is mechanically coupled to the connection device 12. This could be realized with a mechanical lock that is overcome when the collection device 8 is coupled to the connection device 12 or alternatively in a sensor-controlled fashion. A sensor-controlled variation, for example, could cause the control element to be locked and only unlock the control element for an actuation thereof when the collection device is located above the connection device 12. A suitable sensor could detect, for example, an approach to the connection device 12. It would furthermore be conceivable to realize a compact radio or induction link that only has a very short range and a strong directional characteristic such that it only supplies a receiver in the collection device with a signal or a voltage when the collection device is located directly above the connection device 12.

Figure 3C:
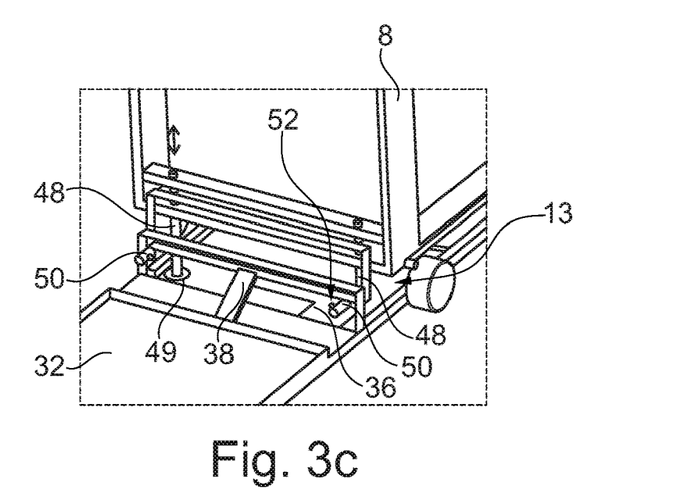

FIG. 3c furthermore indicates that locking bodies 48, which lock the collection device 8 in a fixed position relative to the connection device 12, may be located on a side of the collection device 8 facing the driver 36. For example, the locking elements 48 may be displaced and locked in a direction extending perpendicular to the floor 6 and realized in the form of elongated bodies that are insertable into corresponding openings 49 within the cabin floor 6. It is particularly conceivable that the locking bodies 48 are also connected to the pedal 46 or to another control element that is coupled to or realized separately of the pedal 46. In this context, it is conceivable to only unlock the shutters 44 when the locking bodies 48 are arranged in the associated openings 49.

Figure 4:
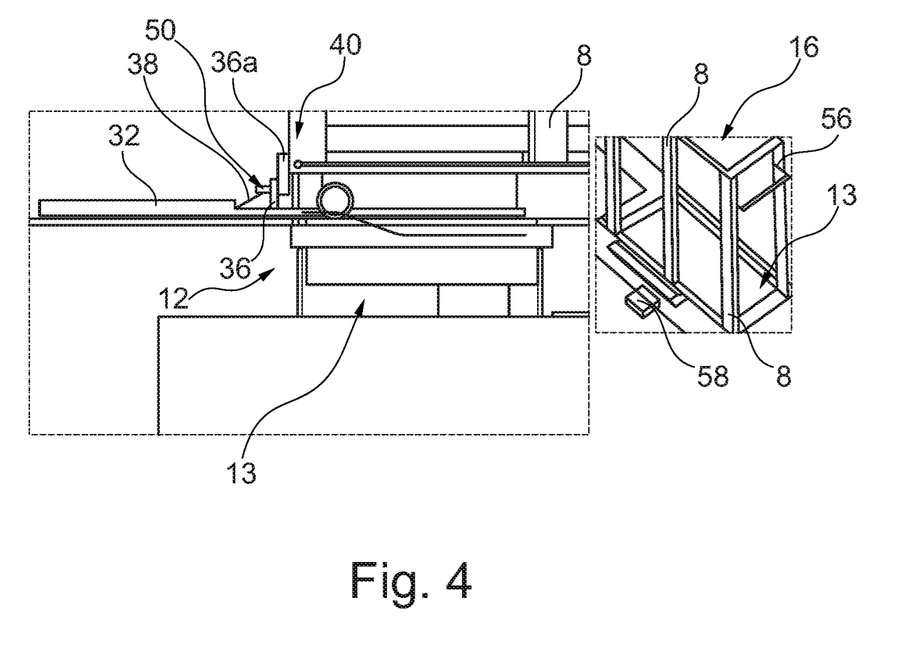
FIG. 4 shows a locked state of the collection device on the driver.

FIG. 4 shows a side view of the collection device 8, the abutment edge 40 of which is in surface contact with the driver 36. For this purpose, a plate 36a, which is arranged between the driver 36 and the abutment edge 40 and compensates a vertical offset between the abutment edge 40 and the driver 36, is additionally illustrated in this figure. This can increase the contact reliability between the collection device 8 and the driver 36, in particular, in the above-described embodiment with a shutter 32 that is movable perpendicular to the cabin floor 6 prior to a displacement.

Connecting elements 50 connected to the plate 36a can engage into corresponding openings of the driver 36. They furthermore comprise locking elements 52 that are illustrated more clearly in FIG. 3 and may engage in the driver 36 once the connecting elements 50 are completely inserted therein. A reliable mechanical coupling between the collection device 8 and the connection device 12 may thereby be produced.

It is conceivable to once again disengage the connecting elements 50 or the locking elements 52 by means of a cable control mechanism 54 such that the collection device 8 is once again freely movable after the delivery of the waste products. For example, the cable control mechanism 54 is for this purpose provided with a handle 56 that is located on an upper side 16 of the collection device 8. This mechanical coupling furthermore makes it possible to close the shutter 32 by pulling back the collection device 8. In all other instances, this has to be realized manually or by means of actuators integrated into the connection device 12.

Figure 5:
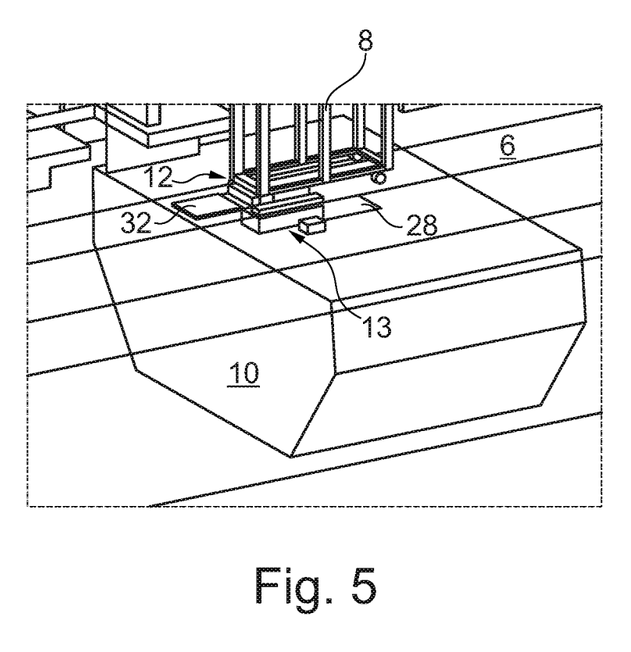
FIG. 5 shows another detailed three-dimensional view.

In FIG. 5, the receptacle device 10, the connection device 12 and the collection device 8 are illustrated directly on top of one another. This figure furthermore shows the electronics unit 58 arranged underneath the cabin floor 6. For example, the electronics unit 58 may comprise a sensor that can detect the presence of the collection device 8 and only drive an actuator, which is not illustrated in FIG. 5, in order to displace the shutter 32 if the presence of the collection device 8 is detected. This may result in particularly high safety within the cabin because inadvertent opening can thereby be ruled out.

Figure 6:
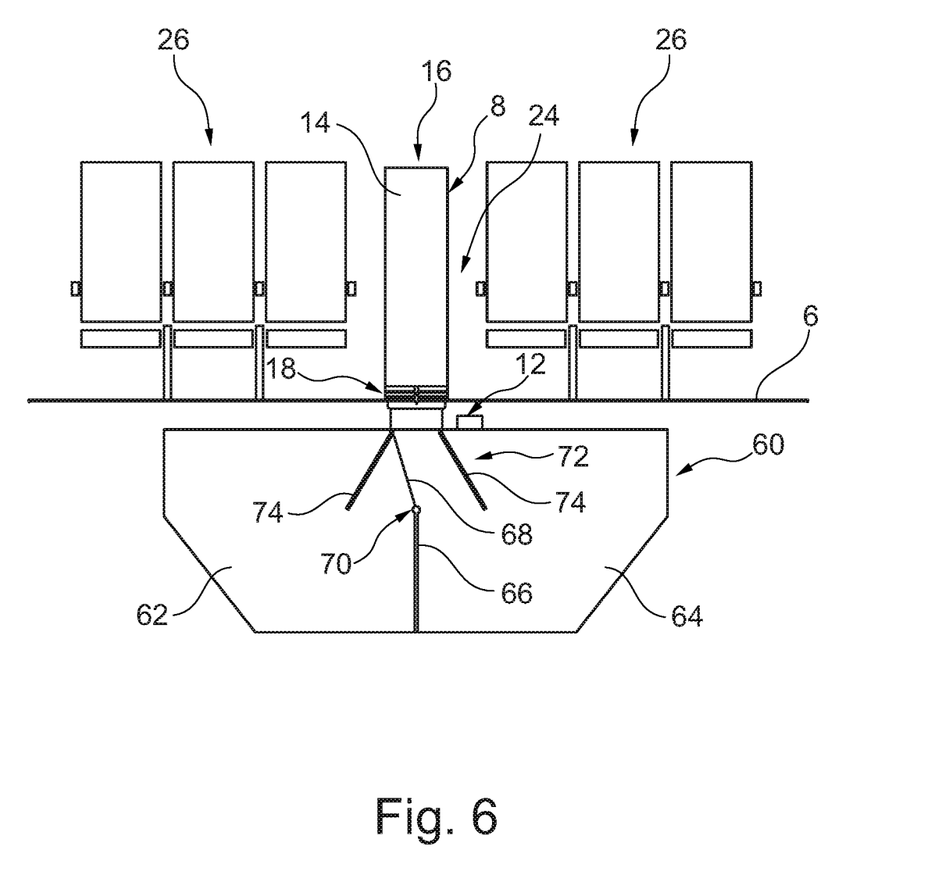
FIG. 6 shows a receptacle device and a collection device in the form of a section, wherein different types of waste products can be separated in the receptacle device.

FIG. 6 ultimately shows a receptacle device 60 that is divided into two chambers 62 and 64, wherein these two chambers are separated from one another, for example, by means of a partition wall 66 extending parallel to the aisle 24. A pivotably mounted skid pad 68 is arranged on an upper end of the partition wall 66 that points toward the floor 6 and extends into the receptacle device 60, for example, over approximately the upper third thereof.

On its end that points away from the floor 6, the skid pad 68 is mounted on a hinge 70 and can shield one of the two chambers 62 and 64 from the connection device 12 when the skid pad 68 is pivoted into such a position that it extends from the hinge up to an outer lateral end of the connection device 12. In the illustration in FIG. 6, the chambers 62 is completely shielded by the skid plate 68 that is pivoted toward the left in the plane of projection. Waste products conveyed into the receptacle device 60 through the connection device 12 slide into the right chamber 64 in the plane of projection along the skid pad 68.

In order to provide the waste products dropping from the collection device 8 with sufficient space for sliding on the skid pad 68, but to simultaneously also allow the precisely limited pivoting motion of the skid pad 68, the receptacle device 60 comprises an exemplary shaft 72 that widens from the connection device 12 toward the interior of the receptacle device 60 and is equipped with sidewalls 74. For example, the skid pad 68 may be respectively aligned parallel to a sidewall 74 such that a temporary shaft having the skid pad 68 and a sidewall 74 extending parallel thereto is respectively formed depending on the position of the skid pad 68.

It is conceivable to drive the skid pad 68 by means of a control unit on the collection device 8 such that the respective type of waste products may be conveyed into the corresponding chamber 62 or 64. This may be realized, for example, with the radio transmission of a signal, with sliding contacts or with a mechanical actuation.

It is furthermore conceivable that the collection device 8 itself comprises two or more chambers for collecting different types of waste products that are successively emptied into the receptacle device 60. For this purpose, the collection device may comprise, for example, several closable output openings that are successively opened, wherein the skid pad 68 has to be moved into different positions when the output openings are opened if the waste products should be delivered into different chambers.

As a supplement, it should be noted that "comprising" does not exclude any other elements or steps, and that "a" or "an" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for disposing waste products in an aircraft, comprising:
    a collection device for collecting waste products in a cabin of the aircraft;
    a separate receptacle device for receiving collected waste products from the collection device; and
    a connection device for selectively connecting the collection device to the receptacle device in order to deliver collected waste products from the collection device into the receptacle device;
    wherein the receptacle device is arranged in a lower deck region underneath a cabin floor;
    wherein the connection device extends at least partially into the receptacle device from the cabin floor and comprises a closure that is arranged on or in the cabin floor;
    wherein the collection device is mechanically couplable to the connection device and comprises a closable opening that is aligned with the closure of the connection device in the coupled state,
    wherein the connection device further comprises a movably mounted driver movable from a stowed position, wherein the movably mounted driver ends flush with the cabin floor, into a driving position, wherein the movably mounted driver protrudes into the cabin from the cabin floor, and locked in the driving position; and
    wherein the driver is mechanically couplable to the collection device.

2. The system of claim 1, wherein the closure and/or the closable opening is only openable when the collection device is coupled to the connection device.

3. The system of claim 1, wherein the closure comprises a shutter that is displaceably mounted parallel to the cabin floor and is displaced between a closed position and an open position.

4. The system of claim 1, wherein the driver is manually movable from the stowed position into the driving position by means of a handle.

5. The system of claim 1, wherein the connection device comprises an actuator coupled to the driver and configured to move the driver between the stowed position and the driving position in response to a control command.

6. The system of claim 5, further comprising a trigger unit positionable on the connection device or the cabin floor, wherein said trigger unit is coupled to the actuator and is configured for driving the actuator in order to move the driver when a trigger signal is received.

7. The system of claim 6,
    wherein the trigger unit comprises a sensor configured for detecting the presence of the collection device at the connection device; and
    wherein the trigger unit is configured for only driving the actuator when the sensor detects the presence of the collection device.

8. The system of claim 1, wherein the collection device comprises at least one pivotably mounted shutter arranged on the closable opening and selectively movable into a horizontal closed position and into an open position, wherein the at least one pivotably mounted shutter is pivoted toward the connection device.

9. The system of claim 8, wherein the collection device comprises at least one control element coupled to the at least one shutter and the at least one locking body and configured for moving the at least one shutter and the at least one locking body simultaneously, successively or independently of one another.

10. The system of claim 1, wherein the collection device comprises at least one movable locking body configured for selectively producing a positive connection with the connection device.

11. The system of claim 1, wherein the receptacle device comprises at least two chambers that are separated from one another by a partition wall and a variable separating device configured for selectively connecting the individual chambers to the connection device.

12. An aircraft comprising a cabin with a cabin floor, a lower deck region, and a system for disposing waste products, the system comprising:
- a collection device for collecting waste products in the cabin;
- a separate receptacle device for receiving collected waste products from the collection device; and
- a connection device for selectively connecting the collection device to the receptacle device in order to deliver collected waste products from the collection device into the receptacle device;
- wherein the receptacle device is arranged in a lower deck region underneath the cabin floor;
- wherein the connection device extends at least partially into the receptacle device from the cabin floor and comprises a closure arranged on or in the cabin floor;
- wherein the collection device is mechanically couplable to the connection device and comprises a closable opening that is aligned with the closure of the connection device in the coupled state,
- wherein the connection device further comprises a movably mounted driver movable from a stowed position, wherein the movably mounted driver ends flush with the cabin floor, into a driving position, wherein the movably mounted driver protrudes into the cabin from the cabin floor, and locked therein; and
- wherein the driver is mechanically couplable to the collection device.

13. A method for disposing waste products in an aircraft, comprising the steps of:
- collecting waste products with the aid of a collection device;
- positioning the collection device above a connection device that is arranged in or on the cabin floor;
- opening the connection device; and
- delivering collected waste products from the collection device into a receptacle device arranged underneath the cabin floor through the connection device,
- wherein the connection device comprises a movably mounted driver movable from a stowed position, wherein the movably mounted driver ends flush with the cabin floor, into a driving position, wherein the movably mounted driver protrudes into the cabin from the cabin floor, and locked therein; and
- wherein the driver is mechanically couplable to the collection device.

14. The method of claim 13, further comprising the step of locking the collection device simultaneously with or prior to opening the connection device.

* * * * *